No. 692,483. Patented Feb. 4, 1902.
C. C. RUEGER.
STAMP BATTERY CAM.
(Application filed May 22, 1901.)
(No Model.)
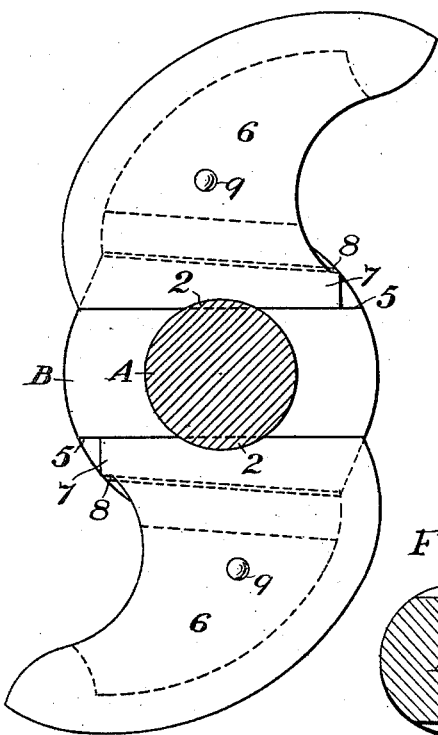
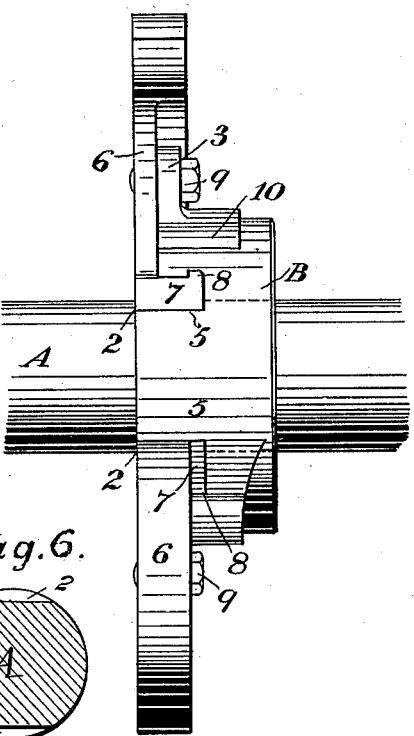
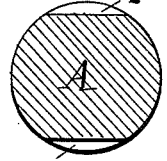
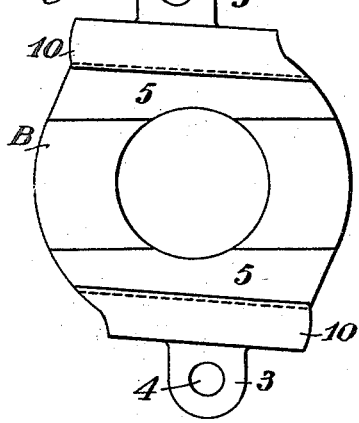
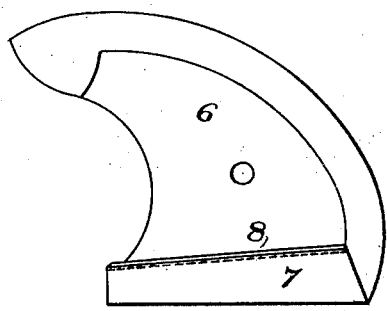
Witnesses,
Inventor,
Charles C. Rueger
By Dewey Strong & Co.
THE NORRIS PETERS CO., PHOTO-LITHO., WASHINGTON, D. C.

UNITED STATES PATENT OFFICE.

CHARLES C. RUEGER, OF BUTTE, MONTANA.

STAMP-BATTERY CAM.

SPECIFICATION forming part of Letters Patent No. 692,483, dated February 4, 1902.

Application filed May 22, 1901. Serial No. 61,350. (No model.)

*To all whom it may concern:*

Be it known that I, CHARLES C. RUEGER, a citizen of the United States, residing at Butte, county of Silverbow, State of Montana, have invented an Improvement in Stamp-Battery Cams; and I hereby declare the following to be a full, clear, and exact description of the same.

My invention relates to improvements in cams of the class which are especially employed in connection with the stamps of ore-crushing mills, but which may also be utilized for any cam for other purposes.

It consists in a novel construction of a hub and independent cam-arms with means for detachably fixing the arms to the hub and locking the hub to the shaft.

It also comprises details of construction which will be more fully explained by reference to the accompanying drawings, in which—

Figure 1 is an end view of my improvement in position upon its supporting-shaft, the latter being in section. Fig. 2 is a face view. Fig. 3 is a face view of the cam-hub. Fig. 4 is a rear face view of a cam. Fig. 5 is an end view of a cam. Fig. 6 is a cross-section of the shaft, showing the transverse notches.

In the stamp-battery and like cams which are commonly employed for alternately lifting and dropping the stamps the two cam-arms are usually cast in a single piece with the hub and the whole is secured to the cam-shaft by tapered key set into a key-seat, and when a cam-shaft, which may have a large number of these cams fixed to it, is in place the only way to repair the broken cam is to remove the shaft from its bearings and remove or slide along a sufficient number of the cams to reach the place where the broken one is located and to allow a new one to be put upon the shaft, all of which causes a great loss of time. Various devices have been employed to overcome this difficulty, since the continued shocks of operation are liable to break the cams in time.

My invention is designed to preserve the hub, which is placed upon the cam-shaft and which is least liable to damage, and to so dispose of the cam-arms that they can at any time be removed or replaced without disturbing any of the others and with very little stoppage of working operation.

As shown in the accompanying drawings, A is the cam-shaft, and B is the hub of the cam, which is bored to make a snug fit upon the shaft. At points where the cam-hubs are to be secured the shaft has transverse notches made upon opposite sides, as shown at 2. The hub has extensions 3 upon opposite sides and lugs with holes through them, as at 4. Through the hub and at opposite sides are planed the tapered or wedge-shaped seats 5, extending through the hub and their inner sides intersecting the bore of the hub, so as to coincide with the seats 2 of the shaft, in line with which the inner faces of the seats 5 will stand when the hubs are in place. The cam-arms 6 are made of the usual form and dimensions regulated by the required drop of the stamps, and their bases or inner ends are provided with wedge-shaped ribs 7 and auxiliary upturned ribs 8 at the inner edges thereof, both of which ribs fit the correspondingly-shaped channels or seats 5, which have been planed in the hub. The upturned portion 8 engaging the corresponding part of the wedge-shaped channel serves to prevent the lateral separation of the hub from the cam-arms.

In order to assemble the parts on the shaft, any number of hubs necessary or desired are placed upon the cam-shaft, brought into line with the transverse notches or seats 2. The cam-seats of the hubs being in line with these notches, the wedge-shaped portions 7 and 8 of the cam-arms are inserted into the respective seats upon opposite sides of the shaft, and when in proper position holes are drilled corresponding with the holes in the lugs 4 and threaded, and bolts, as at 9, may be introduced to more firmly secure these parts in position.

In order to prevent an undue wedging strain on the hub, a stop-shoulder is provided, as at 10, and against these shoulders the cam-arms will abut, so as to prevent the cams from being unduly wedged by the successive shocks of the tappets against which they act.

The shape of the ribs and the seats into which they fit act to retain the cam-arms with sufficient rigidity and in the proper plane; but if either of them is not sufficiently rigid or is out of true when they are set up against the shoulder this irregularity may be corrected by inserting a shim of suitable thickness into the notch in the shaft. In order to make all parts strictly interchangeable, everything is made to exact gages and templets, so that little or no fitting remains to be done. The screws 9 are made with a tight fit in the threads, so that they are not liable to jar loose. By this construction it is easy at any time to remove a broken cam-arm and replace it with a new one without disturbing the remainder of the cams upon the shaft and with but little loss of time.

The various parts are so proportioned that while the cam-arms have the sectional strength indicated by successful practice they will always be the weakest part of the combination, and therefore the most liable to yield to shock or strain, while the hub is rarely if ever damaged, and can thus be preserved indefinitely.

Having thus described my invention, what I claim as new, and desire to secure by Letters Patent, is—

1. A sectional cam, consisting of a hub provided with wedge-shaped sockets or seats formed therein, independent cam-arms having a wedge-shaped base adapted to fit the seats in the hub, said seats intersecting the bore into which the cam-shaft fits, said shaft having transverse notches registering with the seats of the cam-hub.

2. A cam consisting of separate arms having wedge-shaped bases, with supplemental projecting ribs, a hub having tapering seats planed therethrough, corresponding in shape with the bases, and ribs whereby the lateral separation of the interlocking parts is prevented.

3. A cam consisting of a hub bored to fit upon the cam-shaft and provided with wedge-shaped seats made transversely upon opposite sides of the hub, and cam-arms having wedge-shaped bases adapted to fit the seats in the hub and to lock the latter to the shaft, there being shoulders formed upon the hub against which the cam-arms abut to prevent undue wedging.

4. The combination in a cam of a hub bored to fit the cam-shaft, having transverse wedge-shaped cam-seats, cam-arms having wedge-shaped bases adapted to fit the seats in the hub, stops to limit the inward movement of the cam-arms, there being lugs upon the hub, with holes through the lugs and coincident parts of the cam-arms, and screws fitted thereto.

5. A cam-shaft having transverse notches, cam-hubs bored to fit the shaft and having wedge-shaped key-seats made therethrough, intersecting the bore and coincident with the notches of the shaft, cam-arms having the wedge-shaped bases adapted to fit the seats in the hub and to lock the latter to the shaft, there being shoulders fixing the position of the cam-arms upon the hub, and locking-lugs and screws by which the cam-arms are further secured.

In witness whereof I have hereunto set my hand.

CHARLES C. RUEGER.

Witnesses:
J. A. RUEGER,
ALFRED HAHN.